Sept. 6, 1932.  A. E. WIENHOLZ ET AL  1,876,480
STONE SAW
Filed Jan. 7, 1931
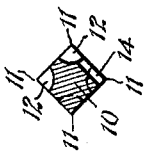
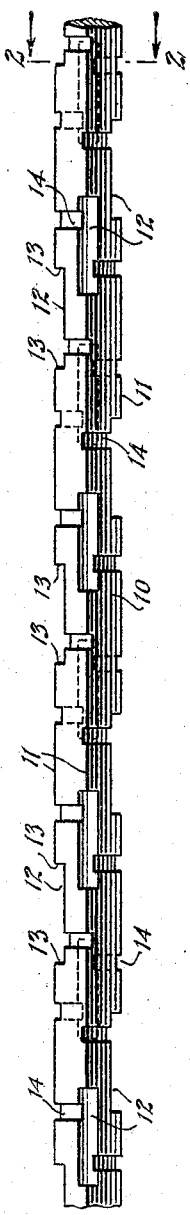
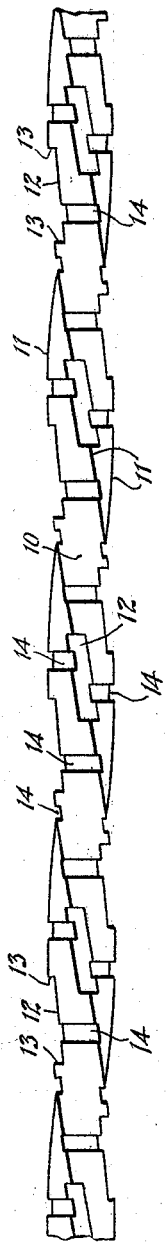
WITNESSES
INVENTOR
Albert E. Wienholz
Frederick Siefke
BY
ATTORNEY Patented Sept. 6, 1932

1,876,480

UNITED STATES PATENT OFFICE

ALBERT E. WIENHOLZ, OF NEW YORK, AND FREDERICK SIEFKE, OF BROOKLYN, NEW YORK

STONE SAW

Application filed January 7, 1931. Serial No. 507,264.

This invention relates to saws for cutting stones of all kinds. The saw of the present invention may be used with or without metallic or other abrasive and is also adapted to be magnetized, if desired, to possess the power to attract and hold metallic abrasive.

The principal object of the invention is the provision of a saw of the indicated character which will cut rapidly and smoothly, which will be well adapted for holding metallic or other abrasive to augment the cutting action thereof and thereby increase the cutting efficiency, and which may be used in different types of machines including the type shown in United States Patent No. 1,743,057, granted to us.

With the foregoing, other objects of the invention will appear from the embodiment of the invention which by way of example is described in the following specification and illustrated in the accompanying drawing.

Figure 1 is a side view of a portion of stock from which a saw of the present invention is made, the stock being shown as it appears before being twisted;

Figure 2 is a transverse section on the line 2—2 of Figure 1;

Figure 3 is a side view of a portion of the saw.

The saw is made of metal stock in the form of a single strand or element 10, rectangular or non-circular in cross section, preferably square, although it may be triangular or any other desired shape in cross section. The strand or element 10 being rectangular in cross section presents spaced longitudinal cutting edges 11 which are parallel to each other. The strand or element 10 is preferably twisted as shown in Figure 3 to increase the cutting efficiency of the saw, it being apparent that the cutting edges 11 will be spiral, yet parallel to each other.

In accordance with another feature of the invention the edges 11 are swaged to provide indentations 12 at regular intervals and each indentation presents shoulders 13. The indentations of one edge are staggered in relation to those of the other edges.

The indentations 12 receive therein metallic abrasive, such as shot, or metal filings, or any other suitable abrasive which augments the cutting action of the cutting edges 11. It is to be understood that the saw may be magnetized, if desired, to possess the power to attract or pick up and hold the metallic abrasive used.

In accordance with another feature of the invention, the strand or element 10 is swaged to provide grooves 14 which extend transversely of the four faces thereof between the edges 11. The grooves 14 also receive the abrasive material used and constitute means to prevent the abrasive from passing along the saw during the reciprocation thereof in the kerf of the stone while being cut. The grooves 14 are arranged at the desired intervals so as to be properly distributed throughout the length of the saw to perform the function stated in an effective manner in co-operation with the indentations 12.

It is to be understood that a saw embodying the features hereinabove described may be in the form suitable for use in conjunction with rotatable pulleys, and that it may also be made of suitable length to be connected at its opposite ends with certain means for reciprocating it to produce the cutting action.

Claim:

A saw for cutting stone consisting of a strand of metal presenting a plurality of spiral cutting edges extending parallel to each other in spaced relation, each of said edges having indentations therein, and there being grooves in said strand which extend transversely between said edges.

ALBERT E. WIENHOLZ.
FREDERICK SIEFKE.